United States Patent [19]
Hawkins

[11] 3,876,631
[45] Apr. 8, 1975

[54] PROCESS FOR THE PREPARATION OF NITROGEN-CONTAINING DERIVATIVES OF ACIDS

[75] Inventor: Edwin George Edward Hawkins, Lower Kingswood, England

[73] Assignee: BP Chemicals (U.K.) Limited, London, England

[22] Filed: Aug. 11, 1967

[21] Appl. No.: 664,594

[30] Foreign Application Priority Data
Aug. 12, 1966 United Kingdom............... 36107/66
Mar. 3, 1967 United Kingdom............... 10070/67

[52] U.S. Cl. ................. 260/239.3 A; 260/234.3 R; 260/290 P; 260/293.86; 260/307 R; 260/404; 260/540; 260/586 R
[51] Int. Cl. ............................................. C07d 53/06
[58] Field of Search. 260/239.3, 239.3 LP, 239.3 A, 260/239.86

[56] References Cited
FOREIGN PATENTS OR APPLICATIONS
1,412,979   8/1965   France ............................ 260/239.3
1,094,273  12/1967   United Kingdom............. 260/239.3

Primary Examiner—Henry R. Jiles
Assistant Examiner—Robert T. Bond

[57] ABSTRACT

Nitrogen-containing derivatives of alkane-$\alpha,\omega$-dioic acids having nitrogen bound to the 12 carbon atom e.g. $\omega$-cyano-alkanoic acids and $\omega$-carbamoylalkanoic acids, are produced by heating a compound of formula

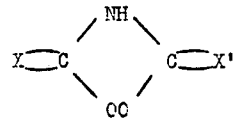

where X and X' are divalent aliphatic radicals which may be the same or different.

16 Claims, No Drawings

PROCESS FOR THE PREPARATION OF NITROGEN-CONTAINING DERIVATIVES OF ACIDS

The present invention relates to the production of nitrogen-containing derivatives of alkanoic acids.

The derivatives produced by the process of the present invention are useful in the production of polyamides, thus they may be converted to amino-acids by hydrogenation. They may also be used as intermediates in the preparation of diesters (for plasticizers) or in condensation resins.

According to the present invention the process for the production of derivatives of alkane-α,ω-dioic acids having nitrogen bound to the ω- carbon atoms comprises heating a compound of formula

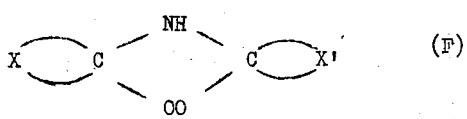

(F)

where X and X' are divalent aliphatic radicals, which may be the same or different.

Compounds of formula (F) such as compounds

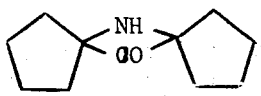

1,1'-peroxydicyclopentylamine which is a white solid with a melting point of 22°–23°C.

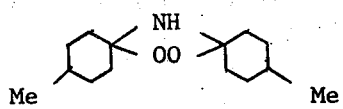

4,4'-dimethyl-1,1'-peroxydicyclohexylamine which is a white solid with melting point 119° – 121°C.

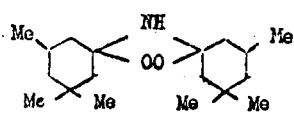

3,3',3',3',5,5'-hexamethyl-1,1'-peroxydicyclohexylamine which boils at 124' –126°C at a pressure of 0.4 mm Hg.

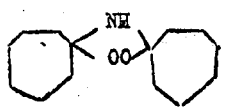

1,1'-peroxydicycloheptylamine which boils in the range 120° – 130°C at a pressure of 0.8 mm Hg.

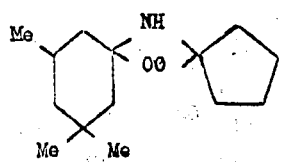

1,1'-peroxy-3,3,5-trimethylcyclohexyl cyclopentylamine which boils at 92° – 96°C at 0.3 mm.Hg.

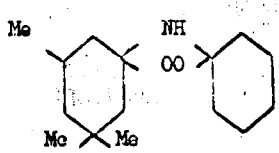

1,1'-peroxy-3,3,5-trimethylcyclohexyl cyclohexylamino

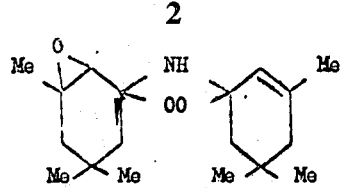

b.p. 136° – 141°C at 0.3 mm.Hg.

(VIII)

1,1'-peroxydicyclohexylamine which is a white solid insoluble in water but soluble in ethanol, which melts at 40° – 41.5°C and distills at 94° – 97°C at a pressure of 0.4 mm.Hg. and at 138° – 140°C at a pressure of 12 mm.Hg., may be made by reacting together at least one compound having the essential skeletal structure:

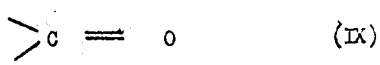

(IX)

with hydrogen peroxide and ammonia.

The free valencies of the carbon atom in the structure (IX) may be satisfied by any group which will be inert under the reaction conditions, i.e., will not enter into reaction with ammonia or hydrogen peroxide.

The carbonyl compound may be acyclic or cyclic. Where the carbonyl compound is acyclic examples of suitable groups which may be bound to the free valencies are hydrogen and alkyl, preferably lower alkyl. It is preferred that at least one alkyl group is bound to a free valency of the carbon atom of structure (IX) the ether group being hydrogen or alkyl, to give compounds of formula $$R_{77}R_{78}CO$$

(X)

where $R_{77}$ is alkyl and $R_{78}$ is hydrogen or alkyl. Preferably alkyl groups are bound to both free valencies. Specific examples of carbonyl compounds which may be used are acetone, ethyl methyl ketone, and n-butyraldehyde.

The compounds formed by reaction of a compound of formula (X) with hydrogen peroxide and ammonia are those of formula (II)

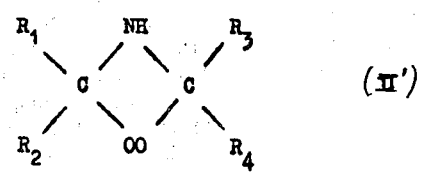

(II')

In place of acyclic carbonyl compounds, at least one compound of formula

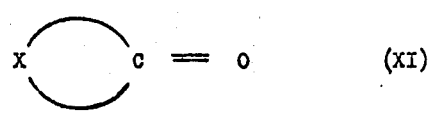

(XI)

where X is a divalent radical may be used. Carbon atoms may be the only atoms in the ring. The cyclic ketone may be for example a ketone with between five and 12 carbon atoms in the ring, would then have 4 – 11 carbon atoms forming part of the ring.

Examples of suitable ketones are those of formulae

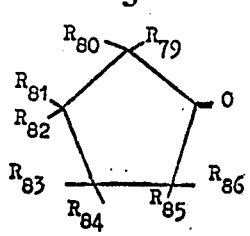  (XII)

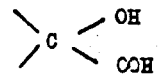  (XV)

and

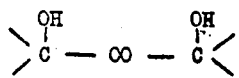  (XVI)

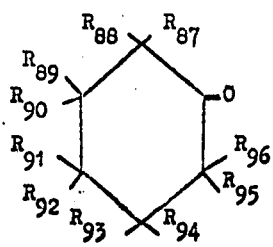  (XIII)

and where compounds of formula (XV) and (XVI) exist they may be reacted with ammonia to give compounds containing the structural unit (I). Thus the formation of compounds containing the structural unit (F) by reaction of compounds of formula (XI), hydrogen peroxide and ammonia may proceed by way of compounds of formula

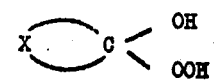  (XVII)

and

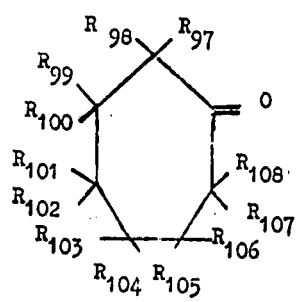  (XIV)

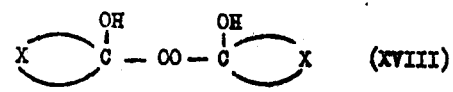  (XVIII)

where X is a divalent aliphatic radical, and where peroxides of the above formula can be formed e.g. by oxidation of cyclic alcohols with molecular oxygen or by reaction of cyclic ketones with hydrogen peroxide, these peroxides may be reacted with ammonia to give compounds of formula (F).

where $R_{79}$ to $R_{108}$ are alkyl groups or hydrogen.

The preferred compounds are those where $R_{79}$ to $R_{108}$ are hydrogen or lower alkyl e.g. methyl, ethyl, propyl, but compounds with longer alkyl chains can also be used. Examples of compounds of the above formulae which may be used are those in which not more than one alkyl group is joined to each carbon atom in the ring. Compounds in which two alkyl groups are joined to a single carbon atom may be used, however. When the ring is a six carbon atom ring, then any gem-dialkyl groups are preferably substituted in positions 3,4 or 5 on the ring.

Examples of ketones which may be used are cyclopentanone, 2-methylcyclohexanone, 3-methylcyclohexanone, 4-methylcyclohexanone, 3,3,5-trimethylcyclohexanone (dihydroisophorone), and cycloheptanone.

The compounds produced by reaction of a compound of formula (XI) with hydrogen peroxide and ammonia are those of formula (F). Where only one compound of formula (XI) is used, and the radical X is inert under the reaction conditions the radicals X and X' in the compound of formula (F) will be the same although the compound of formula (F) may exist in a number of different stereoisomers.

It is possible that formation of compounds having the structural unit (I)

from carbonyl compounds having the structure (IX) by reaction with ammonia and hydrogen peroxide proceeds by way of compounds containing the structural unit Thus 1,1'-dihydroxydicyclohexyl peroxide

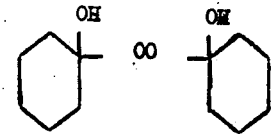

can be reacted with ammonia to give 1,1'-peroxydicyclohexylamine.

In the same way the formation of compounds of formula (II) from compounds of formula (X), hydrogen peroxide and ammonia may proceed by way of compounds of formula

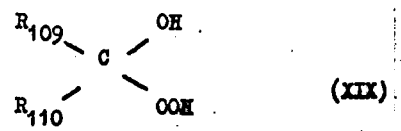  (XIX)

or

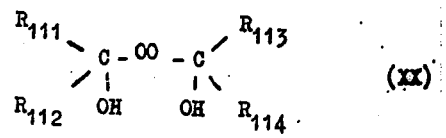  (XX)

where $R_{109}$, $R_{111}$ and $R_{113}$ have the same meaning as $R_{77}$ in formula (X) while $R_{110}$, $R_{112}$ and $R_{114}$ have the same meaning as $R_{78}$ in formula (X) and where these exist they may be reacted with ammonia to give compounds of formula (II).

It is possible that the formation of the compounds of formula (IV) from compounds of formula (XI), hydrogen peroxide and ammonia may proceed by way of an intermediate of formula

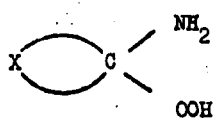 (XXI)

which then reacts further. Where compounds of formula (XXI) can be isolated they may be reacted with compounds (IX) to give compounds of formula (I). Thus compounds containing the structural unit (I) may be prepared by reacting a compound of formula

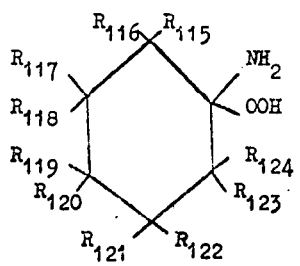 (XXII)

with a compound containing the structural unit

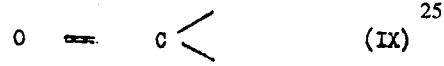 (IX)

$R_{115}$ to $R_{124}$ have the same meaning as $R_5$ to $R_{14}$ in structure (III) and the remarks made concerning $R_5$ to $R_{14}$ in connection with structure (III) apply also to $R_{115}$ to $R_{124}$ in the compound of formula (XXII). Before proceeding with the discussion of the reaction of (XXII) and (IX) it will be necessary to discuss the preparation of (XXII). Compounds of structure (XXII) may be prepared by reacting together a cyclic ketone of formula

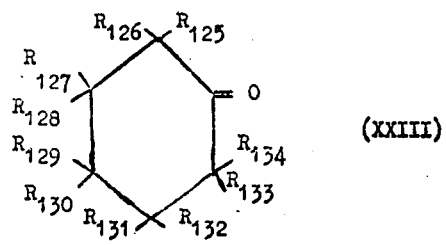 (XXIII)

with ammonia and hydrogen peroxide where $R_{125}$ to $R_{134}$ have the same meaning as $R_5$ to $R_{14}$ in formula (III) and the remarks made concerning $R_5$ to $R_{14}$ in connection with (III) apply also to $R_{125}$ to $R_{134}$ in (XXIII). A particularly preferred compound of formula (XXIII) is 3,3,5-trimethylcyclohexanone, as the compound of formula (XXII) namely 1-amino-3,3,5-trimethylcyclohexyl hydroperoxide is readily isolated from the reaction mixture before further reaction takes place.

A novel compound of formula (XXII) which may be produced by the process described above is 1-amino-3,3,5-trimethylcyclohexyl hydroperoxide. This compound whose structure was established by nuclear magnetic resonance and infra-red spectroscopy, and by elemental analysis is unstable if kept at temperatures much above 0°C and melts with decomposition at 67° – 67.5°C. The compound may be made by the process of the present invention using dihydroisophorone as the cyclic ketone

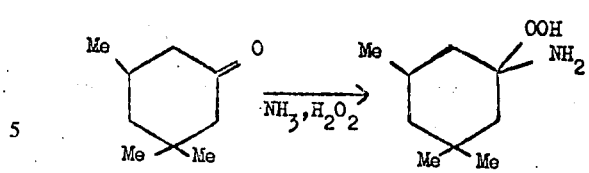

Another novel compound which may be made by the process of the present invention is 1-amino-4-methylcyclohexyl hydroperoxide which may be made by the process of the present invention using 4-methylcyclohexanone as starting material.

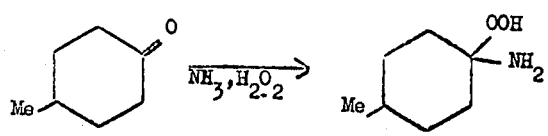

Other novel compounds of formula (XXII) are 1-aminocyclohexylperoxide

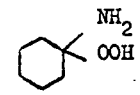

which has m.p. 57° – 58°C (rapid heating), 47°C with decomposition (slow heating), and 1-aminocyclododecyl hydroperoxide which has m.p. of 72° – 73°C.

Having discussed the formation of the compounds of formula (XXII) we will return to the reaction of these compounds with compounds of formula (IX). The comments made concerning the groups which may be on the free valencies of the compound containing the structural unit (IX) in connection with the preparation of compounds containing the structural unit (I) apply also to the reaction of (XXII) and (IX). Thus compounds of formula (X) may be used, to give products of formula (II) while compounds of formula (XI) give products of formula (F)

Examples of specific carbonyl compounds which may be used are formaldehyde, acetaldehyde, n-butyraldehyde, acetone, ethyl methyl ketone, diethylketone, acetophenone, cyclopentanone, cycloheptanone, and 3,5,5-trimethylcyclohexanone.

All the reactions described above can be carried out without a catalyst, although catalysts can be used, by bringing the reactants into contact. This may be done by mixing the reactants in the liquid phase. Where the reactants are all liquids or gases as may often be the case when carbonyl compounds of structure (IX), hydrogen peroxide and ammonia are being reacted together, simple mixing of the reactants may be sufficient. Where one of the reactants is a solid it may be dissolved in a solvent, which should preferably be miscible with the other constituents of the reaction mixture. Thus when reacting carbonyl compounds with hydrogen peroxide and ammonia the solvent used should be miscible, preferably completely, with hydrogen peroxide and water. Even if the reactants are all liquids or gases it may be desirable to add a solvent to ensure adequate contact between the reactants. Thus when reacting carbonyl compounds, hydrogen peroxide and ammonia together it may be desirable to add a liquid which is a solvent for the carbonyl compound and is miscible preferably completely with hydrogen peroxide and water. It may often be convenient to use a solvent in which the reactants are soluble and the desired reaction product insoluble so that the reaction product can be separated from the reaction mixture by filtration. This may be particularly useful when dealing with the less stable products, as the need to carry out distillations or solvent extractions which can cause considerable losses of product is thereby avoided. Examples of solvents which may be used are methanol, ethanol, light petroleum, ether, dioxan, dimethylformamide.

When bringing reactants into contact to carry out the reaction it is not essential that all the reactants should be entirely in the liquid phase and it may be desirable to mix the reactants together in the presence of a solvent for one of the reactants and the reaction product.

Where hydrogen peroxide is a reactant it will generally be in the form of an aqueous solution. The strength of this solution may vary between moderately wide limits. Examples of suitable hydrogen peroxide solutions are those containing between 5–100% by weight of the total solution of hydrogen peroxide. Thus commercially available solutions containing about 28–30% by weight of hydrogen peroxide are satisfactory. The reaction mixture may contain a hydrogen peroxide stabiliser e.g. sodium ethylene diamine tetraacetate (LDTA).

The concentration of hydrogen peroxide in the reaction mixture in which it is used will depend not only on the strength of the hydrogen peroxide solution added but on the quantities of other reactants and solvents present. The quantity of hydrogen peroxide in the reaction mixture may vary over a wide range. Examples of suitable concentrations of hydrogen peroxide in the reaction mixture are those in the range 5–40% by weight, particularly suitable concentrations being those in the range 10–20% by weight.

In the reaction of carbonyl compound (IX) with hydrogen peroxide and ammonia the molar ratio of ketone and hydrogen peroxide reacted together may vary over a moderately wide range for example between 4:1 and 0.5:1 but when preparing compounds having the structural unit (I) it is preferred to use at least 2 moles of ketone for 1 mole of hydrogen peroxide, the stoichiometric ratio being 2:1. When it is desired to prepare compounds of formula (XXII) it is preferred to use a molar ratio of ketone to hydrogen peroxide of about 1:1, this being the stoichiometric ratio for the reaction.

Where ammonia is a reactant it may be fed into the reaction mixture in the form of a gas or as a solution in for example water. The concentration of the ammonia solution may vary over moderately wide limits and 0.880 ammonia, i.e., an aqueous solution having a relative density of 0.880, is suitable. If desired the reaction may be started with the ammonia added to the other reactants as a solution and may be continued by passing gaseous ammonia into the reaction mixture. Where ammonia is a reactant it is preferred to use a slight excess over the stoichiometric quantity but the quantity of ammonia is not critical.

The temperatures at which the reactions described above may be carried out will depend upon the thermal stability of the reactants and products as the use of temperatures sufficiently high to decompose the reactants and products must be avoided.

When preparing compounds of structure (I) in which the free valencies of both carbon atoms do not bond the carbon atoms into a ring e.g. when preparing compounds of formulae: (II) or (III). Examples of temperatures which may be used are temperatures in the range −20°C to +20°C, in particular −10°C to +10°C. When reacting compounds of formula (XI) with hydrogen peroxide and ammonia or compounds of formula (XVII) or (XVIII) with ammonia it may be possible to use a somewhat wider range of temperatures, for example temperatures in the range −20°C to +60°C, preferably those in the range 0°C to 50°C. Temperatures of about 40°C are often particularly suitable. In the preparation of compounds of formula (XXII) and in the reaction of those compounds with compounds (IX) it is preferred to use temperatures in the range −20°C to +20°C, for example temperatures in the range −10°C to +10°C in particular temperatures below 0°C. The duration of the reaction when preparing compounds containing the structural unit (I) will depend upon the temperature and the particular reactants used and may vary over a wide range. The reaction may be complete in 2 to 3 hours but longer time may sometimes be desirable.

When preparing amino-hydroperoxides of formula (XXII) it may be necessary to control the reaction time carefully to prevent the compound (XXII), reacting further. The optimum time for this reaction can be determined by the man skilled in the art and may for example range from 1/2 to 7 hours. The pressure in the reactions described above may vary over a moderately wide range, atmospheric pressure or pressures close to atmospheric pressure generally being most convenient. When carrying out reaction in which ammonia is a reactant pressures below atmospheric pressure will cause a reduction in the ammonia concentration in the reaction system which may lead to reduced yields and it may be desirable to use pressures above atmospheric pressure to obtain a high concentration of ammonia.

The reactions described above can be carried out batchwise or continuously.

The peroxide (I) and (XXII) may be recovered in any suitable manner or may be used, without recovery, in further reactions. Where the reaction is carried out in aqueous solution the peroxide of formula (I) will generally separate out as a solid or in a liquid layer from the aqueous solution. Where the peroxide (I) is to be reacted further, this product rich in peroxide (I) can be separated from the reaction mixture and used without further purification. Alternatively the peroxide (I) may be extracted from the reaction using a suitable organic solvent e.g. chloroform, ether, light petroleum, benzene, or ethyl acetate. The peroxide (I) may then be separated from the extract by distillation, if necessary under reduced pressure, provided that the distillation temperature is not so high as to decompose the peroxide. Alternatively, it may be possible to precipitate the peroxide from the extract by addition of water. It may also be possible to obtain the solid crystalline peroxide directly by filtration from the reaction mixture.

The 1-amino-hydroperoxides (XXII) will often precipitate from the reaction mixture and can be separated by filtration from the reactants. Where other products are obtained which are insoluble in the reaction mixture it may often be possible to dissolve these other products with hydrophobic solvents e.g. light petroleum.

It should be noted that the compounds according to the present invention are not restricted to those made from carbonyl compounds (IX) carrying groups which are inert under the reaction conditions. The groups bonded to the free valencies shown in structure (I) may well differ from those found in the compounds from which the compound of structure (I) is prepared. Thus when ammonia and hydrogen peroxide are reacted together with a carbonyl compound which contains groups which react with ammonia and/or hydrogen peroxide it may often still be possible to obtain compounds containing the structural unit (I) but the groups bonded to the free valencies in the structure (I) will not necessarily then be the same as those bonded to the carbonyl group in the starting material.

The invention will now be illustrated by the following Examples. The perchloric acid equivalents of substances given in the examples were determined by titrating an anhydrous N/10 solution of perchloric acid in acetic acid with a solution in acetic acid of a weighed sample of the substance whose equivalent is being determined. The peroxide or active oxygen equivalents of substances given in the examples were determined by adding a saturated solution of potassium iodide (containing a quantity of potassium iodide in excess of that required to react with all the peroxide groups in the substance under investigation), to acetic acid to which a small quantity of sodium bicarbonate is added to generate carbon dioxide. A weighed sample of the substance under investigation is then added, the mixture heated on a boiling water bath for 5 minutes, and then cooled. A little water is then added and the mixture titrated with N/10 sodium thiosulphate solution.

EXAMPLE I

Acetone (58 g.), 30% hydrogen peroxide (70 c.c) and the sodium salt of E.D.T.A. (1.0 g.) were mixed and saturated with gaseous ammonia at about 0°C., and the solution stored overnight at 0°C. The solution was extracted with ether and the ethereal extract dried and evaporated. Distillation of the residue gave a fraction (21.1 g.), b.p. 55°/12 m.m., which on redistillation gave a product b.p. 40° – 42°C at 12 m.m.Hg. This product on analysis was shown on the basis of elemental analysis, nuclear magnetic resonance, and infra-red spectroscopy to be 2,2'-peroxy-diprop-2-ylamine

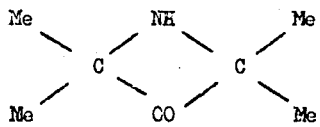

The peroxide equivalent was 135 and the perchloric acid equivalent was 147. The elemental analysis gave C, 55.05%; H, 10.1%; N, 10.2%.

EXAMPLE II

Ethyl methyl ketone (72 g.), 30% hydrogen peroxide (70 c.c.), ammonium acetate (8 g.) and sodium salt of E.D.T.A. (1.- g.) were mixed and treated with gaseous ammonia as in Example 1. The solution was stored at 0°C overnight and then extracted with ether. Distillation of the ethereal extract gave a fraction (46.7 g.), b.p. 66° – 68°at 12 m.m.Hg. pressure. The peroxide equivalent was 157, the perchloric acid equivalent was 161 and the elemental analysis was C,59.4%; H,10.85%; N,8.4%.

This was identified as 2,2'-peroxy-dibut-2-ylamine

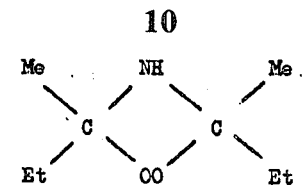

EXAMPLE III

A mixture of n-butyraldehyde (72 g.), 30% hydrogen peroxide (70 c.c.), methanol (45 c.c.), ammonium acetate (8 g.) and sodium salt of E.D.T.A. (1 g.) was cooled to about 0°C and saturated with gaseous ammonia. The solution was stored at 0°C overnight and extracted with ether. The ethereal extract was evaporated to leave a residue (74.5 g.) having a peroxide equivalent of 171. A small portion of this residue was distilled to give a fraction b.p. 50°C at 0.1 m.m.Hg., with peroxide equivalent of 165 and a perchloric acid equivalent of 188, and elemental analysis C,60.5%; H,10.95% and N,8.9%.

This product was identified as 1,1'-peroxy-dibut-

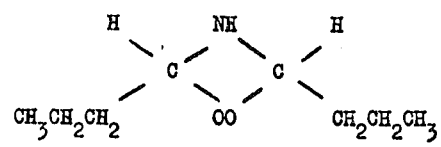

EXAMPLE IV

A mixture of isophorone (41.4 g.), 30% hydrogen peroxide (45.2 c.c.), methanol (350 c.c.), 0.880 ammonia (80 c.c.), and sodium salt of E.D.T.A. (1.0 g.) was cooled to temperatures at or below 0°C and saturated with gaseous ammonia, then stored at 0°C for several days. A solid (0.8 g.) was filtered off, rinsed with cold ethanol and refiltered, to give material with m.p. 74° – 81°, perchloric acid equivalent 1.79. Elemental analysis gave C, 56.2%; H, 9.2%; N, 7.1%. Spectroscopic evidence showed this to be the 1-amino-1-hydroperoxide of epoxyisophorone

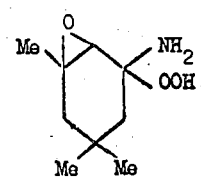

The filtrate was extracted with ether and the ethereal extract evaporated and distilled to give a fraction (27.7 g.) b.p. 54°C at 0.3 mm. Hg; consisting mainly of isophorone epoxide with some isophorone, and a fraction (3.4 g.) b.p. 136° – 141°C at 0.3 mm. Hg, with perchloric acid equivalent of 340 and active oxygen equivalent of 199. Elemental analysis gave C, 69.4%, H, 9.2%, N, 5.3%.

This peroxide

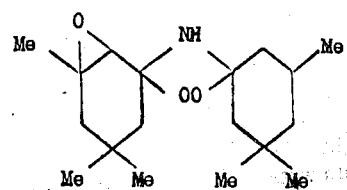

was of the type according to the present invention and this example illustrates the production of compounds according to the present invention from carbonyl compounds in which the groups bound to the carbonyl group are not inert.

EXAMPLE V

1-Amino-3,3,5-trimethylcyclohexyl hydroperoxide (34.6g.) was added with stirring to acetaldehyde (12 g.) in petrol (light petroleum spirit (b.p. 40° – 60°C)) (60 c.c.) with the temperature kept at below 0°C. When the peroxide had dissolved, the aqueous layer was separated, and the organic phase treated with concentrated sulphuric acid (6 drops) and magnesium sulphate and left at room temperature. The solution was then filtered, washed with water, dried, and distilled. In addition to dihydro-isophorone a product (32.0 g.) was obtained which boiled at 70° – 78°C at 0.5 mm. Hg. pressure, and had a peroxide equivalent of 221. Elemental analysis gave C, 66.3%; H, 10.6%; N, 7.0%. This was identified as:

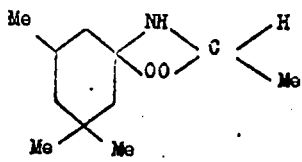

EXAMPLE VI

1-Amino-3,3,5-trimethylcyclohexyl hydroperoxide (17.3 g; 78% pure) was added with stirring to acetaldehyde (12 g.) in light petroleum (b.p. 40° – 60°C) (50 c.c) with cooling to below 0°C. When the hydroperoxide had dissolved, the organic layer was separated, treated with solid magnesium sulphate and stored at 0°C overnight. The solution was then filtered, washed and distilled as in Example I and gave, in addition to dihydroisophorone, the same product (13.0 g.) as Example I.

EXAMPLE VII

The process of Example I was repeated but using 17.3 g. of 78% pure 1-amino-3,3,5-trimethylcyclohexyl hydroperoxide, 30 c.c. of light petroleum and 3 drops of sulpuric acid. The reaction mixture was allowed to stand at 0°C for 4 hours and then worked up as in Example I to give the same peroxide product as in Example I (15.4 g.).

This product on redistillation had a b.p. of 68° – 74°C at 0.5 mm.Hg. pressure. On analysis the redistilled product gave C, 66.3%; H, 10.6%; N, 7.0%. The calculated values wore C, 66.3%; H, 10.55%; N, 7.0%.

EXAMPLE VIII

Butyraldehyde (14.4 g.) was mixed with petrol (b.p. 40° – 60°) (50 cc.) and to the stirred solution at < 0° was added 1-amino-3,3,5-trimethylcyclohexyl hydroperoxide (17.3 g.; 89% pure). The peroxide dissolved within a few minutes. To the solution were added magnesium sulphate and concentrated sulphuric acid (6 drops) and the mixture stored at 0° overnight. The solution was filtered, the filtrate washed with water, dried and distilled to give unreacted butyraldehyde, dihydroisophorone and a product (11.1 g.), b.p. 85° – 110°/1.0 mm. with a peroxide equivalent of 231, and a perchloric equivalent of 233. The elemental analysis gave C, 68.6%; H, 11.05%; N, 6.6%. The product was identified as:

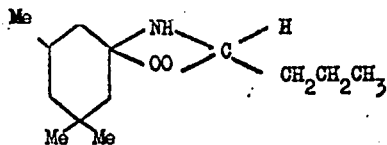

EXAMPLE IX

Butyraldehyde (28.8 g.) in petrol (100 c.c) was cooled to below 0° and with stirring treated with 1-amino-1-hydroperoxy-3,3,5-trimethylcyclohexane (33 g.; 93% pure). When the solid had dissolved the aqueous phase was removed and the petrol solution dried with magnesium sulphate overnight at 0°. The working up as in Example IV gave butyraldehyde, dihydroisophorone and the same peroxide (33.0 g.) b.p. 96° – 98°/0.6 mm, as in Example IV.

EXAMPLE X

Formaldehyde (17.2 g. of 35% aqueous solution) was stirred in ether (50 c.c), together with sodium bicarbonate (2 g.) at below 0° (and 1-amino-3,3,5-trimethylcyclohexyl hydroperoxide (16.5g.; 96% pure) added. When the solid had dissolved the aqueous layer was removed and magnesium sulphate added to the ethereal solution, which was stored at 0°C for 2 hours. The solution was filtered and the filtrate evaporated at 15 mm.; the residue was then heated to 54°C at 0.6 mm. Hg. pressure and the fresh residue (9.0 g.), with a peroxide equivalent of 312, was shown, by mass spectrometry, to contain the peroxide

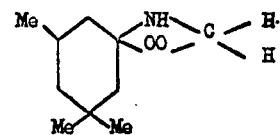

together with higher molecular weight material.

EXAMPLE XI

Acetone (11.6 g.) in ethanol (50 cc.) was stirred at below 0°C and 1-amino-3,3,5-trimethylcyclohexyl hydroperoxide (17.3 g.; 80% pure) added. After stirring for ca. 1 hour the solid had dissolved. To the solution was added magnesium sulphate and it was stored at 0° overnight. Filtration and distillation gave acetone and dihydroisophorone (probably containing some symmetrical amino-peroxide

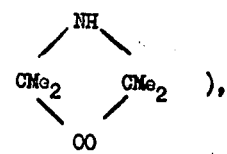

and a product (2.2 g.), b.p. 75° – 78°/1.0 mm, had a peroxide equivalent 239.4 and gave N, 6.3% an elemental analysis. This was identified as the peroxide

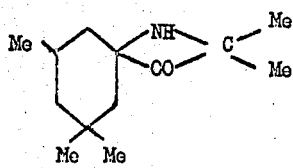

Redistillation of the peroxide gave a sample of the peroxide with a peroxide equivalent of 222, perchloric acid equivalent 235.

EXAMPLE XII

To a stirred mixture of ethyl methyl ketone (57.6 g.) and ethanol (200 cc.), containing ammonium acetate (6.4 g.) and kept at or below 0°C was added 1-amino-3,3,5-trimethylcyclohexyl hydroperoxide (69.2 g; pure). After the solid had dissolved the solution was stored at 0°C overnight. The product was worked up as in the previous Examples to give, on distillation, unreacted ethyl methyl ketone, a fraction (59.4 g.), b.p. 40°–50°/0.4 mm, having a peroxide equivalent of 303 and shown by mass spectrosoopy to be a mixture of dihydroisophorone and the symmetrical peroxide

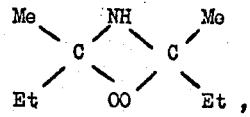

and a fraction (22 g.), b.p. 74°– 78°/0.4 mm., with a perchloric acid equivalent of 231 and perchloric acid equivalent of 227. The elemental analysis gave C, 69.0%; H, 11.2% N, 5.8% which was identified as being the peroxide

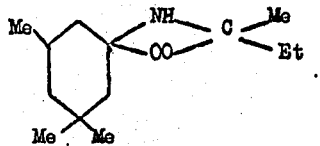

EXAMPLE XIII

To a stirred solution of acetophenone (24.3 g.) in ethanol (50 c.c) containing ammonium acetate (1.6 g.) and kept at or below 0°C, was added 1-amino-3,3,5-trimethylcyclohexyl hydroperoxide (17.3 g.; pure). The solution was kept at 0°C overnight and then worked up as in the previous Examples to give unreacted acetophenone and dihydroisophorone, and a fraction (4.8 g.), b.p. 126°– 130°/0.5 mm. with a peroxide equivalent of 407, shown by mass spectroscopy to contain the peroxide

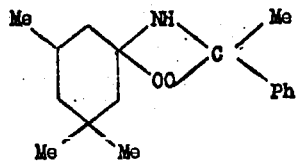

together with some of the symmetrical peroxide

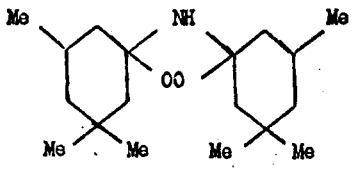

EXAMPLE XIV

To a stirred mixture of cyclopentanone (33.8 g.) and ethanol (100 c.c) containing ammonium acetate (3.2 g.) and kept at or below 0°, was added 1-amino-3,3,5-trimethylcyclohexyl hydroperoxide (44.6 g., 68% pure). After storing at 0°C overnight the reaction mixture was worked up as in the previous Examples to give unreacted cyclopentanone and dihydroisophorone together with a fraction (20.0 g.) b.p. 82°– 86°/0.5 mm. This last fraction was redistilled to give: material b.p. 74°– 76°C/0.3 mm.Hg., peroxide equivalent 202, shown by mass spectroscopy to be a mixture of the peroxide

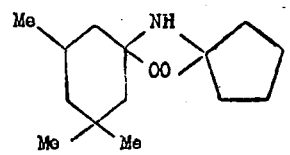

with the symmetrical peroxide

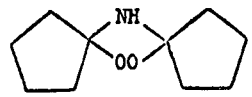

and material b.p. 92°– 96°/0.3 mm, peroxide equivalent 232, shown to be the unsymmetrical component of the mixture referred to above. On analysis the elements found were: C, 69.2%, H, 10.4%; N, 6.1%.

EXAMPLE XV

To a stirred mixture of cycloheptanone (73.2 g.) and ethanol (200 cc.), containing ammonium acetate (6.4 g.) and kept at or below 0°C was added 1-amino-3,3,5-trimethylcyclohexyl hydroperoxide (69.2 g.; 76% pure). After the solid had dissolved (5 hours) the solution was stored at 0°c overnight and the product worked up as in the previous Examples. There were obtained unreacted cycloheptanone, and dihydroisophorone, and fractions (57.5 g.) b.p. 124°–130°/0.3 mm. Hg., peroxide equivalent 283, perchloric acid equivalent 278 shown by mass spectroscopy to contain the peroxide

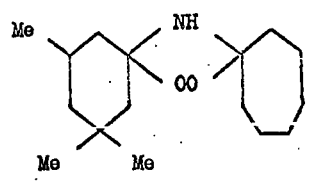

The elemental analysis gave C, 70.9%, H, 10.9%, N, 5.05% in agreement with formula (A).

EXAMPLE XVI

To a stirred mixture of dihydroisophorone (28 g.) and ethanol (50 cc.), containing ammonium acetate (1.6 g.) kept at or below 0°C was added 1-amino-3,3,5-trimethylcyclohexyl hydroperoxide (17.3 g.; pure). The mixture was stored at 0°C for 4 days and then worked up as in the preceding Examples to give dihydroisophorone and a fraction (12.0 g.) b.p. 126°– 128°at 0.4 mm.Hg; peroxide equivalent 322. The elemental analysis gave C, 73.3;H, 11.1%; N, 5.0%.

The product was identified as 1,1'-peroxy-3,3,5, 3',3'',5'-hexomethyl-dicyclohexylamine

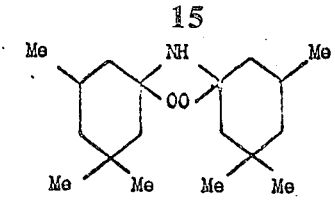

EXAMPLE XVII

To a stirred mixture of cyclohexanone (19.6 g.) and ethanol (50 c.c.), kept at or below 0°C, was added 1-amino-3,3,5-trimethylcyclohexyl hydroperoxide (17.3 g., 78% pure); solution was complete in ca. 10 min. To the solution was added conc. sulphuric acid (3 drops) and magnesium sulphate and the mixture was stored at 0°C for 3 days. The solid was filtered off, the filtrate washed with water, dried and distilled, to give cyclohexanone, dihydroisophorone and a fraction (11.5 g.), b.p. 90- 100°at 0.02 mm. Hg., peroxide equivalent 179. By mass spectroscopy the product was shown to contain the unsymmetrical peroxide

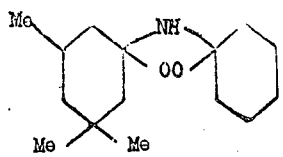

and the symmetrical peroxide, 1,1'-peroxydicyclohexylamine in the ratio 1:9.

EXAMPLE XVIII

To a stirred solution of cyclohexanone (19.6 g.) in ethanol (50 cc), containing ammonium acetate (1.6 g.) and kept at or below 0°, was added 1-amino-3,3,5-trimethylcyclohexyl hydroperoxide (17.3 g.; 78% pure). The solid dissolved in 5 – 10 min., then to the solution was added magnesium sulphate and the mixture stored at 0°overnight. Working up as in the previous Examples led to isolation of a peroxide fraction (13.1 g.) b.p. 98°– 104°/0.3 mm., with ratio of unsymmetrical to symmetrical peroxides of 1:9:8.

EXAMPLE XIX

The reaction of Example XIV was repeated with the stirring carried out at −30°C, and overnight storage at −10°C. There was obtained peroxide (10.5 g.) having a ratio of unsymmetrical to symmetrical peroxide of 1:8,

EXAMPLE XX

To a stirred solution of cyclohexanone (19.6 g.) in dioxan (30 c.c) kept at or below 0°, was added 1-amino-3,3,5-trimethylcyclohexanone (17.3 g.; 78% pure). After the solid had dissolved magnesium sulphate was added and the solution stored overnight at 0°C. Working up as in the previous Examples gave peroxide (4.5 g.) with a ratio of unsymmetrical to symmetrical compounds 1:12:1.

EXAMPLE XXI

The process of Example XVI was repeated, but replacing the dioxan by dimethylformamide. There was obtained peroxide (10.5 g.) with a ratio of unsymmetrical to symmetrical peroxide of 1:8:6.

EXAMPLE XXII

2-Methylcyclohexanone (51 g.), methanol (60 cc)., 0.880 ammonia (35c.c.), 30% hydrogen peroxide (35cc.) and EDTA (0.5 g.) were mixed together at room temperature and the solution saturated with gaseous ammonia. After standing together for 1 week, the product was extracted with ether, the extract dried with magnesium sulphate, the solvent evaporated, 2-methylcyclohexanone (21.3 g.) removed at 0.3 mm., and the residue treated with petrol. Some petrol-insoluble material, m.p. 77°– 79°, was separated, and petrol-soluble portion evaporated and residue distilled to give the required peroxide (7.9 g.), b.p. 107°/0.4 mm., and residue (0.6 g.). Redistillation of the peroxide gave material (b.p. 97°–100°/0.07 mm.) having an active oxygen equivalent of 247, and a perchloric acid equivalent of 244. Elemental analysis gave C, 70.4%; H, 10.3%; N, 8.4%. The structure of the peroxide was confirmed by I.R. and N.M.R. spectroscopy as 1,1'-peroxy-2,2'-dimethyl-dicyclohexylamino

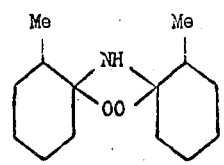

EXAMPLE XXIII

3-Methylcyclohexanone (50 g.), methanol (60 cc.), 0.880 ammonia (35 cc.), 30% hydrogen peroxide (35 cc.) and EDTA (0.5 g.) were mixed together at room temperature and saturated with gaseous ammonia. After standing for one week the product was extracted with ether. Distillation of the extract yielded 3-methylcyclohexanone and a product (27.1 g.) b.p. 105°/0.2 mm., and a residue (1.0 g.). The product was identified as 1,1'-peroxy-3,3'-dimethyldicyclohexylamine

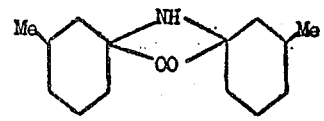

The peroxide equivalent was 235 and the perchloric acid equivalent was 256. The structure was confirmed by I.R. and N.M.R. spectroscopy.

EXAMPLE XXIV

4-Methylcyclohexanone (50 g.), methanol (120 cc.). 0.880 ammonia (135 cc.), 30% hydrogen peroxide (35 cc.), and EDTA (0.5 g.) were mixed at room temperature and the solution saturated with gaseous ammonia. The mixture was stored for 1 week during which time a solid product had separated. The product was extracted with light petrol (b.p. 40°– 60°) to give some insoluble material (6.8 g.), m.p. 79°– 80°(dec.), the 1-amino-4-methylcyclohexyl hydroperoxide; peroxide equivalent (active oxygen), 147.5; perchloric acid equivalent 165. The petrol-soluble material was obtained as solid (26.4 g.) m.p. 119°– 121°; active oxygen equivalent 224; perchloric acid equivalent, 235. The elemental analysis gave C, 70.1% H, 10.5%; N, 6.0%. The I.R. and N.M.R. spectra were in agreement with this product being the desired 4,4'-dimethyl-1,1'-peroxy-dicyclohexylamine. The non-crystalline material (9.0 g.) contained unreacted 4-methyl-cyclohexanone together with further peroxide.

EXAMPLE XXV

Dihydroisophorone (128 g.), 0.880 ammonia (240 cc.), 30% hydrogen peroxide (120 cc.), and EDTA (sodium salt) (2 g.) were mixed and methanol (450 cc.) added in sufficient quantity to give a homogeneous solution. The mixture was stirred at ca. 0° in a stream of ammonia and after a short time solid began to appear. When the solution became thick with solid it was filtered and the filtrate retreated with ammonia to yield further solid.

Distillation of the mother liquors from the reaction product from which the solid had been separated, yielded a small amount of the symmetrical peroxide, 1,1'-peroxy-3,3,5,3',3', 5'-hexamethyl dicyclohexylamine

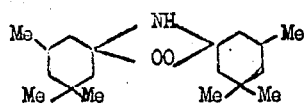

b.p. 115°C at 0.2 mm Hg. Elemental analysis gave C, 73.3%; H, 11.1%, N, 5.0 %. The structure was confirmed by I.R. and mass spectrometry.

EXAMPLE XXVI

Cyclopentanone (77.5 g.), 0.880 ammonia (50 cc.0, water (20 cc.), methanol (45 cc.), E.D.T.A. (sodium salt) (1.0 g.) and ammonium acetate (8.0 g.) were stirred together, and 30% hydrogen peroxide (70 cc.) added with cooling. After storing the mixture for 2 days at 0°. the solution was extracted with ether. The ether extract, on distillation, yielded a low-boiling fraction (56 g.) b.p. 71°/0.1 mm, This product had a peroxide equivalent of 172, and perchloric acid equivalent of 195. Elemental analysis gave C, 4.7% H. 8.9% N, 7.6%. It solidified on storage and, when crystallised from cold petrol, had m.p. 22°– 23°C. This product was identified as 1,1'-peroxy-dicyclopentylamine.

EXAMPLE XXVII

Cycloheptanone (50 g.), methanol (60 cc.), 0.880 ammonia (35 cc.), 30% hydrogen peroxide (35 cc.) and E.D.T.A. (0.5 g.) were mixed at room temperature, saturated with gaseous ammonia and stored for 1 week. Extraction with ether, followed by distillation of the extract yielded cycloheptanone (44 g.), and a product (5.5 g. b.p. 120°– 130°/0.8 mm., which had peroxide equivalent 331 and perchloric equivalent 306. This was identified as

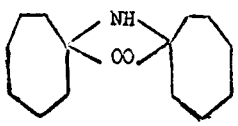

1,1'-peroxy-dicycloheptylamine and a residue (1.6 g.).

EXAMPLE XXVIII

Cyclohexanone (90g.) ammonia (50 cc.), water (20 cc.), methanol (45 cc.) and E.D.T.A. (1 g.) were stirred together and 30 % hydrogen peroxide (70 cc.) gradually added with the reaction temperature kept at −35°. The mixture was stored at room temperature overnight, the product extract with ether, and the extract evaporated and the residue distilled to give cyclohexanone (22 g.) and a product which was identified as 1,1'-peroxy-dicyclohexylamine (64.4 g.), and leave a residue (2.0 g.). The peroxide distils at 94 – 97/0.4 mm., 138°– 140°/12 mm, and has a melting point of 40°– 41.5°.

EXAMPLE XXIX

The same conditions were used as in Example XXVIII except that after the period of storage the bottom oily layer was separated, dissolved in ethanol, and the ethanolic solution added, with stirring, to water (2 litres). The 1,1'-peroxy-dicyclohexylamine separated as solid and filtered off. The yield of slightly wet product was 82 g., redistillation giving 72.6 g. of pure peroxide.

EXAMPLE XXX

Cyclohexanone (90 g.), 0.880 ammonia (32 cc.). water (20 cc.), methanol (45 cc.) and E.D.T.A. (0.2 g.) were stirred together and 30% hydrogen peroxide (70 cc.) gradually added with the reaction temperature kept at −35°. The mixture was stored at room temperature overnight, the oily layer separated, diluted with an equal volume of methanol and the methanolic solution added, with stirring, to cold water (2 litres). Solid was filtered off and on distillation gave the peroxide 1,1'-peroxy-dicyclohexylamine (71.5 g.).

EXAMPLE XXXI

Cyclohexanone (90 g.), 0.880 ammonia (50 cc.), water (20 cc.), methanol (45 cc.) and E.D.T.A. (1.0 g.) were stirred together, and 30% hydrogen peroxide (70 cc.), added, with the reaction temperature kept at −35°. The temperature was kept at 35° for 4 hours and gaseous ammonia slowly passed into the solution. The mixture was stored overnight at room temperature; the peroxide crystallised out from the solution on addition of water and was filtered off. Distillation gave cyclohexanone (3.5 g.) and 1,1'-peroxy-dicyclohexylamine (77.8 g.). The aqueous phase was extracted with ether and provided cyclohexanone (4.8 g.) and no peroxide.

EXAMPLE XXXII 1,1'-Dihydroxydicyclohexyl peroxide (26.5 g.), 0.880 ammonia (12.5 cc.), water (35 cc.), methanol (12 cc.) and E.D.T.A. (0.2 g.) were stirred together until the solid peroxide had dissolved and the mixture left at room temperature overnight. The product was extracted with ether and the ethered extract on distillation, gave cyclohexanone (<1 g.) and 1,1'-peroxy-dicyclohexylamine (17.6 g.).

The 1,1'-peroxydicyclohexylamine may also be made by reacting the autoxidate of cyclohexanol, i.e., the product of oxidation of cyclohexanol with molecular oxygen, with ammonia.

EXAMPLE XXXIII

A mixture of dihydroisophorone (44.9 g.; 0.31 mole), 0.880 ammonia (110 cc.), ethanol (150 cc.) and E.D.T.A. (sodium salt)(0.5 g.) was cooled and ca. 30% hydrogen peroxide (40 cc.; 0.375 mole) added. The stirred mixture was kept at below 0°C and ammonia gas passed in. After 6 hours the solid produced was filtered off and the filtrate cooled and retreated with ammonia. Two further crops of solid were obtained. The solid had perchloric acid equivalent of 181 and peroxide equivalent of 164 and elemental analysis gave C, 65.2%; H, 10.9%, N, 7.8%, was washed with water, cold alcohol, then petrol, and dried in vacuo: yield, 33,4 g.(0.19 mole). The product was identified as 1-amino-3,3,5'-trimethylcyclohexyl hydroperoxide.

The filtrate and washings were found to contain 0.15 mole unreacted hydrogen peroxide and 0.115 mole dihydroisophorone.

EXAMPLE XXXIV

Dihydroisophorone (44.9 g.; 0.31 mole), 0.880 ammonia (60 cc.), methanol (150 cc.), and E.D.T.A. (sodium salt) (0.5 g.) were mixed and cooled; ca. 30% hydrogen peroxide (40 cc., 0.375 mole) was added, and the stirred, cooled mixture treated with ammonia as above.

There were obtained 1-amino-3,3,5'-trimethylcyclohexyl hydroperoxide (48.9 g.; 0.275 mole), dihydroisophorone (4.3 g.; 0.31 mole), and there was present in the filtrate and washings 0.1 mole unreacted hydrogen peroxide.

EXAMPLE XXXV

4-Methylcyclohexanone (50 g.) methanol (120 cc.), 0.880 ammonia (135 cc.), 30% hydrogen peroxide (35 cc.) and E.D.T.A. (0.5 g.) were mixed at room temperature (ca. 20°C) and the solution saturated with gaseous ammonia. The mixture was stored for 1 week, during which time a solid product separated. The product was extracted with light petrol (b.p. 40° – 60°C). Insoluble material (6.8 g.) remained after the extraction. This material had m.p. 79° – 80°(deo.) peroxide equivalent 147.5 and perchloric acid equivalent 165 and was identified as 1-amino-4-methylcyclohexyl hydroperoxide.

EXAMPLE XXXVI

Cyclododecanone (60.6 g.) was mixed with ethanol (450 cc.), 86% hydrogen peroxide (13.4 g.), 0.880 ammonia solution (20 cc.) ammonium acetate (3 g.) and E.D.T.A. (sodium salt; 1 g.), the solution saturated with gaseous ammonia and stored at ca. 0° for 3 days. The solid aninohydroperoxide (57.6 g) was filtered off. A portion recrystallised from benzene had m.p. 72° – 73°, a peroxide equivalent of 210, and perchloric acid equivalent of 215 (calc, 215). The I.R. and N.M.R. spectra were in agreement with the proposed structure, and it had an elementary analysis of C, 66.3; H, 11.5; N, 6.1% Calc. for $C_{12}H_{25}NO_2$: C, 66.9; H, 11.6; N, 6.5%.

EXAMPLE XXXVII

30% Hydrogen peroxide (70 cc.) was added rapidly to a stirred solution of cyclohexanone (49 h.) and E.D.T.A. (sodium salt) (0.5 g.) in methanol (30 cc.) and 0.880 ammonia (55 cc.). The temperature rose to ca. 30°, but rapid cooling reduced this to 0°– 15°; storage for 1 hour at <0° ceased crystallisation. The product was filtered off, washed well with ice-cold water, then petrol, and dried on a porous plate; this product (57 g.), had m.p. 57° –58° (rapid heating), 47° (slow heating) (with decomposition) and had a peroxide equivalent of 140 and perchloric acid equivalent of 135 (calc 131). Found: C, 55.1; H, 9.85; N. 10.9; calc for $C_6H_{13}NO_2$; C, 55.0; H, 9.95; N, 10.7%.

EXAMPLE XXXVIII

1-Aminocyclohexyl hydroperoxide (13.1 g.), cyclohexanone (9.8 g.) methanol (25 cc.) and ammonium acetate (1.0 g.) were mixed and stored at 0° overnight. Next day the product was water, with wter, extracted with ether and the ethereal extract distilled to give unreacted cyclohexanone and 1,1'-peroxydicyclohexylamine (12.5 g.), which recrystallised from petrol had m.p. 39.5° – 40.5°, undepressed on admixture with authentic peroxide.

EXAMPLE XXXIX

1-Aminocyclohexyl hydroperoxide (13.1 g.), dihydroisophorone (14 g.), methanol (25 cc.) and ammonium acetate (1.0 g.) were mixed, stored at 0°C overnight and worked up as in the previous Example. Distillatiton gave cyclohexanone and dihydroisophorone (9.0 g.), an intermediate fraction (3.2 g.), b.p. below 100°C/0.7 mm., Hg., a fraction (8.1 g.), b.p. 110° – 114°/0.7 mm. of 3,3,5'-trimethyl-1,1' -peroxy-dicyclohexlamine (peroxide equivalent, 234; perchloric acid equivalent, 245); and residue (1.5 g).

EXAMPLE XL

1-Aminocyclohexyl hydroperoxide (13.1 g. butyraldehyde (7.2 g.), methanol (25 cc.) and ammonium acetate (1.0 g.) were mixed and stored at 0°C overnight. Working up as in Example XXXIX, gave cyclohexanone and butyraldehyde, and a product (8.4 g.), b.p. 89°/0.3 mm. (peroxide equivalent, 204; perchloric acid equivalent, 206; which was identified as

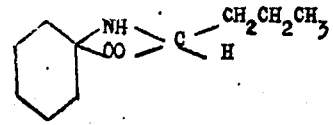

The number of carbon atoms in each of the radicals X and X' which form part of the rings shown in Formula (F) may for example vary from four to 11, i.e., there may be from five to 12 carbon atoms in each ring. Examples of compounds of formula (F) are those compounds where X and X' are divalent aliphatic radicals and four to six of the carbon atoms in each of X and X' form part of the rings. Examples of such compounds are a)

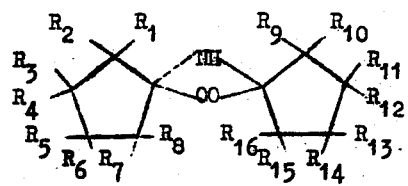

and b)

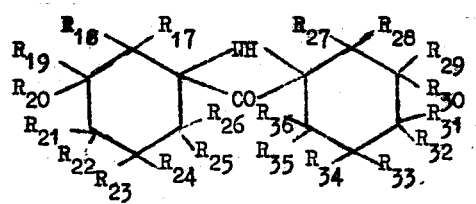

and c)

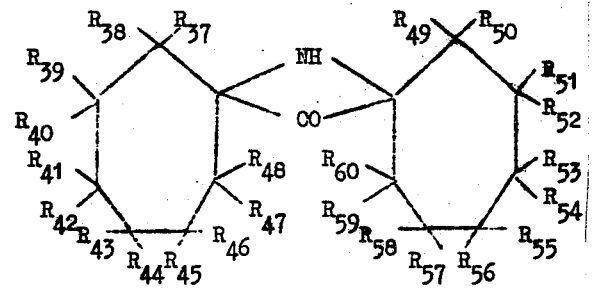

where $R_1$ to $R_{60}$ are alkyl groups or hydrogen.

The preferred compounds are those in which $R_1$ to $R_{60}$ is hydrogen or lower alkyl, e.g. having one to 10 carbon atoms in the chain, in particular those having from one to five carbon atoms in the chain e.g. methyl, ethyl, propyl.

Specific examples of compounds which can be used in the process of the present invention are:

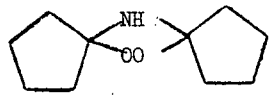

1,1'-peroxydicyclopentylamine.

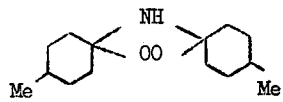

4,4'-dimethyl-1,1'-peroxydicyclohexylamine.

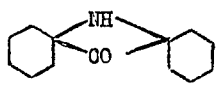

1,1'-peroxydicyclohexylamine.

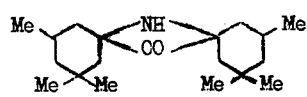

3,3,3',3',5,5'-hexamethyl-1,1'-peroxydicyclohexylamine.

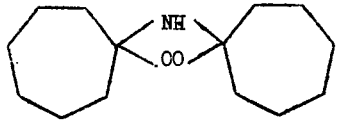

1,1'-peroxydicycloheptylamine.

The present invention is concerned with the production of derivatives of alkane-α,ω-dioic acids in which nitrogen is bound to the ω-carbon atom. This nitrogen atom must therefore form part of a nitrogen-containing carboxylic acid derivative e.g. —CONH$_2$, —CONH-CO— or —CN. At the other end of the alkane chain the α-carbon atom of the derivative of the alkane-α,ω-dioic acid may for example form part of a carboxylic acid group or of a derivative of a carboxylic group linked to the nitrogen on the ω-carbon atom.

Examples of derivatives of alkane-α,ω-dioic acids having nitrogen bound to the ω-carbon atom are

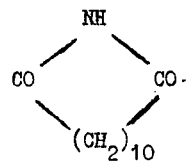 (II)

decane-1,10-dicarbonimide which is an example of the imide type of derivative;

 (III)

11-cyanoundecanoic acid which is an example of the nitrile or cyanoacid type of derivative;

 (IV)

11-carbamoylundecanoic acid which is an example of the amide-acid type of derivative; and derivatives of these compounds in which the carbon chain carries alkyl substituents, e.g. 11-cyano-dimethylundecanoic acids.

The number of carbon atoms in the chain having the carboxyl group or its derivative at either end will contain the same number of carbon atoms as the sum of the carbon atoms which form part of the two rings and this chain will carry the substituents originally present on the two rings.

Thus 3,3'-dimethyl-1,1'-peroxydicyclohexylamine

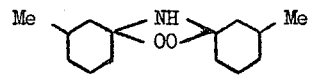

contains 12 atoms forming part of the rings and the two rings have a total of two methyl substituents, and can be thermally decomposed to give dimethyl-11-cyanoundecanoic acid in which there are 12 carbon atoms in the chain containing the carboxylic acid group and its derivative —CN.

The peroxyamine fed to the thermal decomposition reaction may be in the form of the pure compound separated from the reaction mixture in which the peroxyamine is formed. Peroxyamine-rich products which can be readily separated from the reaction in which peroxyamine is produced may be used however without further purification. Thus in the production of peroxyamines by reaction of cyclic ketones, hydrogen peroxide and ammonia, the peroxyamine often separates as an oil layer, containing also unchanged ketone, from the aqueous reaction medium. This oil layer can be fed to the thermal decomposition reaction without isolation of the peroxyamine.

The reaction may be carried out in the liquid or vapor phase but if the maximum yield of the alkane-α,ω-dioic acid derivative is required it is preferred to carry out the reaction in the vapor phase. The preferred temperatures are in the range 300° to 1,000°C e.g. temperatures in the range 300°C to 600°C. Where it is desired to produce the maximum yield of the nitrile-acid derivative it is preferred to use temperatures in the range 400°C to 600°C. If the reaction is to be carried out in the vapor phase it is preferred to use reduced pressures. Examples of suitable pressures are those in the range 0.1 to 300 mm. Hg., preferably 10 mm. to 300 mm. Hg. % –

The vapor phase reaction may be carried out in any suitable manner, for example by feeding a solution of the peroxyamine into the top of a heated column, which may be packed with inert material e.g. glass balls and withdrawing the product containing the desired derivatives from the base. It is desirable that the peroxyamines should be heated to the reaction temperature as quickly as possible. This may be achieved by spraying the peroxyamine, either molten or in solution, into gas heated to temperatures in excess of the desired reaction temperature, the gas being cooled to the desired reaction temperatures by vaporisation of the liquid. The pyrolysis may be carried out in an atmosphere of an inert gas, e.g. nitrogen. Any solvent which is inert to the conditions of the pyrolysis reaction may be used for dissolving the peroxide, e.g. ethanol, pyridine, β-picoline, benzene, chloroform, aqueous ethanol, cyclohexanone, tributylamine, ethylene glycol. The solution may be of any desired concentration for example 10%–100% by weight e.g. 50% – 100% by weight peroxide based on weight of solvent. The solvent may in fact form a minor proportion of the mixture, thus mixtures consisting of 90% by weight of the peroxide (F) and 10% by weight of cyclohexanone may be used, the small proportions of cyclohexanone being sufficient to give a liquid mixture. The peroxide may also be fed as a vapour without solvent, e.g. in a stream of inert gas.

The principal nitrogen containing derivatives of alkane-$\alpha$, $\omega$-dioic acids produced in the vapor phase reaction are imides, nitrile-acids and acid-amides; if 1,1'-peroxydicyclohexylamine is heated in the vapor phase reaction at elevated temperature, the dicarbonimide is decane-1,10-dicarbonimide (II), the nitrile acid is 11-cyanoundecanoic acid (III) and the acid amide is 11-carbamoylundecanoic acid (IV). The skeletal structure of the derivatives produced will depend upon the nature and position of any substituents on the rings of the compound (F) fed to the reactor. The type of derivative produced will depend on the reaction conditions. High temperatures favor the formation of the nitrile acids. At a given temperature the proportion of nitrile-acid is increased by increased by increasing the pressure at which the thermal decomposition is carried out, by decreasing the rate of feed to the heated column or by increasing the concentration of peroxide in the solvent, i.e., by increasing the contact time.

The vapor phase reaction is rapid and examples of residence times of the peroxyamine which can be used are: 0.1 seconds to 2 seconds.

Examples of methods by which the derivative of alkane-$\alpha$,$\omega$ dioic acid may be separated from the crude product are distillation and recrystallisation from solvents.

The nitrogen-containing alkane-dioic acid derivatives produced in the thermal decomposition step such as $\omega$-carbamoyl-alkanoic acids and $\omega$-cyano-alkanoic acids may be converted to $\omega$-amino-alkanoic acids which are useful in the production of polyamides by hydrogenating them or their alkali metal salts, in the presence of a hydrogenation catalyst. The mixture of thermal decomposition products may be separated into its components which may be hydrogenated separately, or the mixture may be hydrogenated without being separated into its components. Where the alkali metal salts of the nitrogen-containing alkane-dioic acid derivatives, can be formed, these may be used in the hydrogenation reaction giving the corresponding alkali metal salts of the $\omega$-amino-alkanoic acid. Thus alkali metal salts of $\omega$-carbamoyl-alkanoic acids and $\omega$-cyano-alkanoic acids may be used.

The hydrogenation to give 1-aminododecanoic acid is carried out in the presence of a hydrogenation catalyst. Examples of such catalysts are the noble metal catalysts for example (a) platinum catalysts in particular in the form of the finely divided metal e.g. Adam's catalyst (b) palladium catalysts e.g. palladium on charcoal catalysts (c) rhodium catalysts. Other hydrogenation catalysts which may be used are the mixed noble metal catalysts e.g. rhodium-platinum, rhodium-palladium, rhodium-ruthenium, and ruthenium palladium catalysts and nickel and cobalt catalysts e.g. Raney catalysts.

The reaction may be carried out in the liquid phase by mixing the material to be hydrogenated with a solvent. The solvent will conveniently be acetic acid when using noble metal hydrogenation catalysts and aqueous alcoholic or aqueous-alcoholic ammonia when using Raney nickel or cobalt catalysts. The catalyst is also intimately mixed with the solution which is then brought into intimate contact with the hydrogen. This may be conveniently done by bubbling hydrogen through the solution or by agitating the solution in a hydrogen atmosphere.

The optimum temperature and pressure for the hydrogenation will depend upon the catalyst used. When noble metal catalysts are used the hydrogenation is conveniently carried out at room temperature e.g. between 10°C – 25°C and at atmospheric pressures. When nickel and cobalt hydrogenation catalysts are used temperatures between 10°C and 200°C and pressures between 1 and 300 atmospheres may be conveniently used. The duration of the reaction will of course depend upon the reaction conditions and reaction times may be 5 hours or more and as short as 20 minutes or less.

The $\omega$-amino-alkanoic acid produced in the hydrogenation reaction may be recovered in any convenient manner. For example when a noble metal catalyst in acetic acid is used the catalyst is filtered off, the solvent evaporated to give the amino-acid, which may then be recrystallised, if required, from e.g. a large volume of water. When Raney nickel or cobalt catalysts in an ammoniacal medium are used the amino-acid is largely precipitated on the catalyst, and may be extracted from the catalyst with a solvent e.g. acetic acid and/or hot water. Any amino-acid in the ammoniacal solvent in which the hydrogenation was carried out will be in the form of the ammonium salt. The acid may be liberated by neutralisation or by evaporating off the ammonia.

The invention will now be illustrated by the following examples. All pressures are given as millimetres of mercury, and all temperatures are in celsius degrees.

EXAMPLE 1

A peroxide was prepared by reacting together 3-methylcyclohexanone, hydrogen peroxide, and ammonia. This peroxide was

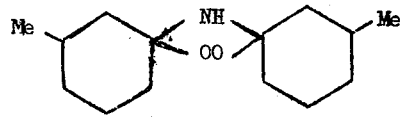

and was probably a mixture of stereoisomers.

The peroxide (5 g.) was dissolved in ethanol (15 c.c.) and the solution dropped through a column (1.5 cm. internal diameter) packed for 8 inches of its length with glass beads and heated to 400°: the pyrolysis was carried out at 150 mm. pressure in a slow stream of nitrogen. Addition of the solution occupied one-half hour. The product was distilled to give 3-methylcyclohexanone (0.4 g.), a methylcaprolactam fraction (1.2 g.), and a fraction (2.6 g.), b.p. 190° – 250°/14 mm., shown by I.R. and N.M.R. spectra to contain dimethyl 11-cyanoundecanoic isomers as well as some lactam and amideacid. The cyano acids were extracted with base, and had b.p. 230° – 240°/14 mm. and acid equivalent, 238.

EXAMPLE 2

A peroxide was prepared by reacting together 4-methylcyclohexanone, hydrogen peroxide, and ammonia. The resulting peroxide, 4,4'-dimethyl-1,1'-peroxydicyclohexylamine (5g.) was dissolved in ethanol (60 cc.) and the solution dropped through the heated column as in Example 1 at 400° and a pressure of 150 mm. in 45 minutes. Part of the peroxide had not reacted, so that the product, after evaporation of the ethanol, was redissolved in benzene (20 cc.) and the solution dropped through the same column in 1 hour. Distillation gave 4-methylcyclohexanone (0.6 g.), a 4-methylcaprolactam fraction (0.8 g.) and a fraction (1.8 g.), b.p. 180° – 240°/14 mm., shown by I.R. spectroscopic examination to contain the expected dimethyl-11-cyanoundecanoic acid as well as some amides and an unsaturated compound.

EXAMPLE 3

3,3,3',3',5,5'-Hexamethyl-1,1'-peroxydicyclohexylamine (10 g.) was dissolved in ethanol (15 c.c.) and the solution dropped through a heated column, as in example 1, at 500°/150 mm. during three/fourths hr. Distillation of the product gave dihydroisophorone (1.7 g.), a trimethylcaprolactam fraction (2.4 g. ), a fraction (1.6 g.), b.p. 180° – 220°/15 mm. and a fraction (2.0 g.) b.p. 240° – 246°/15 mm. containing cyano-acids.

EXAMPLE 4

1,1'-Peroxydicyclopentylamine (10 g.) from cyclopentanone, hydrogen peroxide and ammonia was dissolved in ethanol (10 c.c.) and the solution dropped through a heated column as in example 1 at 500°/150 mm. during three-fourths hr. Distillation of the product gave cyclopentanone (0.1 g.) valeric acid (0.3 g.), an ω-cyanononanoic acid fraction (7.8 g.), and residue (0.5 g.). The cyano-acid had a melting point of 50° – 52°C on recrystallisation.

EXAMPLE 5

1,1'-Peroxydicyclohexylamine (32 g.) dissolved in a mixture of ethanol (100 c.c.) and pyridine (4 c.c.), was fed dropwise during 3 hours into a 14 inch long glass tube half filled with glass balls and heated by a furnace to a temperature of 500° (at middle point). The pressure inside the reaction system was 150 mm. and the pyrolysis was carried out in a slow stream of nitrogen. The product was condensed, the solvent removed and the residue distilled to give three fractions and a residue (0.9 g.). The first fraction (2.8 g.) was largely cyclohexanone but contained some pyridine; the second fraction (5.6 g.) was mainly caprolactam; the third fraction (20.0 g.) solidified and consisted mainly of 11-cyanoundecanoic acid (92.2% by titration).

EXAMPLE 6

1,1'-Peroxydicyclohexylamine (16 g.) dissolved in β-picoline (25 g.) was fed into the reactor used in Example 5 through which a slow stream of nitrogen was passed, at a temperature and pressures of 500° and 150 mm. respectively during 115 minutes. Distillation provided cyclohexanone, a caprolactam fraction (3.1 g.) a fraction (9.1 g.) consisting largely of 11-cyanoundecanoic acid (88.5% by titration) and residue (0.7 g.).

EXAMPLE 7

1,1'-Peroxydicyclohexylamine (8 g.), dissolved in ethanol (40 c.c.) and pyridine (1 c.c.) was fed to the reactor used in Example 5 through which a slow stream of nitrogen was passed at a temperature and pressure of 590° and 15 mm. respectively, during 60 minutes. Distillation gave a fraction (1.2 g.) containing 50% caprolactam together with unreacted peroxide, and a fraction (5.0 g.) containing 87% 11-cyanoundecanoic acid together with caprolactam and decane-1,10-dicarbonimide, as well as residue (0.4 g.).

EXAMPLE 8

1,1'-Peroxydicyclohexylamine (8 g.) dissolved in ethanol (40 c.c.) and pyridine (1 c.c.) was fed to the reactor used in Example 5 through which a slow stream of nitrogen was passed at a temperature and pressure of 500° and 150 mm. respectively during 30 minutes. Distillation gave a caprolactam fraction (0.8 g.), a fraction (5.7 g.) containing 11-cyanoundecanoic acid (82% by titration) as well as caprolactam, and a residue (0.3 g.).

EXAMPLE 9

1,1'-Peroxydicyclohexylamine (8 g.) dissolved in ethanol (10 c.c.) and pyridine (1 c.c.) was fed at a temperature and pressure of 500° and 150 mm. respectively during 60 minutes into the reactor used in Example 5 through which a slow stream of nitrogen was passed. Distillation gave a caprolactam fraction (0.9 g.), a fraction (5.4 g.) containing 11-cyanoundecanoic acid (86% by titration), and residue (0.3 g.).

EXAMPLE 10

1,1'-Peroxydicyclohexylamine (8 g.) dissolved in ethanol (40 c.c.) and pyridine (1 c.c.) was fed into the reactor used in Example 5 through which a slow stream of nitrogen was passed at a temperature and pressure of 400° and 150 mm. respectively during 30 minutes. Distillation gave a caprolactam fraction (0.8 g.), a fraction (5.5 g.) containing 11-cyanoundecanoic acid (40% by titration) and decane-1,10-dicarbonimide, and a residue (0.4 g.).

EXAMPLE 11

1,1'-Peroxydicyclohexylamine (10 g.), dissolved in chloroform (20 c.c.) was fed to the reactor used in example 5 through which a slow stream of nitrogen was passed at a temperature and pressure of 440° and 15 mm. respectively during 35 minutes. Solvent was evaporated from the product, the residue treated with light petroleum, the solution cooled and imide (5.6 g.) filtered off. The filtrate was evaporated and residue distilled to give cyclohexanone (0.7 g.), a caprolactam fraction (0.9 g.), and a fraction (1.6 g.) containing mainly 11-cyanoundecanoic acid with some 11-carbamoylundecanoic acid.

EXAMPLE 12

1,1'-Peroxydicyclohexylamine (8 g.) dissolved in pyridine (20 c.c.) and water (10 c.c.) was fed into the reactor used in example 5 through which a slow stream of nitrogen was passed at a temperature and pressure of 510° and 15 mm. respectively during 45 minutes. The product was dissolved in chloroform and dried with anhydrous magnesium sulphate. The solvent was evaporated and the residue mixed with light petroleum and cooled to yield 11-cyanoundecanoic acid (4.2 g.). The filtrate was distilled to give a fraction (0.8 g.) consisting mainly of caprolactam, and a fraction (1.0 g.), largely the cyano-acid (11cyanoundecanoic acid).

EXAMPLE 13

1,1'-Peroxydicyclohexylamine (8 g.) dissolved in cyclohexanone (20 g.) was fed into the reactor used in example 5 through which a slow stream of nitrogen was passed at a temperature and pressure of 440° and 15 mm. respectively, during 40 minutes. The cyclohexanone was removed under reduced pressure and the residue treated with light petroleum and cooled to yield slightly impure decane1,10-dicarbonimide (2.6 g.). Distillation of the filtrate gave a caprolactam fraction (0.6 g.) and a fraction (3.2 g.), containing decane-1,10-dicarbonimide, cyanoundecanoic acid and carbamoylundecanoic acid.

EXAMPLE 14

1,1'-Peroxydicyclohexylamine (8 g.) dissolved in a mixture of ethylene glycol (20 g.) and ethanol (8 c.c.) was fed into the reactor used in Example 5 through which a slow stream of nitrogen was passed at a temperature and pressure of 440° and 15 mm. respectively during 40 minutes. The product was diluted with chloroform, washed with water to remove glycol and ethanol, the chloroform solution evaporated and petrol added to the residue. Cooling led to the separation of imide (4.0 g.) and the filtrate was distilled to give cyclohexanone (0.7 g.) a caprolactam fraction (0.5 g.) and a fraction (1.3 g.) containing decane-1,10-dicarbonimide, 11-cyanoundecanoic acid, and 11-carbamoylundecanoic acid.

EXAMPLE 15

1,1'-Peroxydicyclohexylamine (16 g.) dissolved in ethanol (8 g.) was pumped during 9 minutes into a stainless steel U-tube (17 in. long × three-eighths in. inside diameter) through which was passing a stream of preheated nitrogen (4.5 l./h. at N.T.P.). Both the reactor and nitrogen preheater were immersed in a salt-bath heated to 500° and the pressure within the reaction system was 150 mm. The product was condensed and the solvent removed to leave 13.6 g. of residue which was shown to contain 8.8 g. of 11-cyanoundecanoic acid (by titration and infra-red analysis) and 1.7 g. of caprolactam (by gasliquid chromatography).

EXAMPLE 16

1,1'-Peroxydicyclohexylamine (14.8 g.) was distilled under nitrogen through a 21 in. long empty glass reactor heated by a furnace to a temperature of 500°. The pressure inside the system was 0.1 mm. The product (14.7 g.) was shown to contain 8.6 g. of 11-cyanoundecanoic acid, 1.7 g. od caprolactam and 1.9 g. of cyclohexanone.

EXAMPLE 17

The process of Example 15 was repeated but using instead of solid 1,1'-peroxydicyclohexylamine, a portion (16 g.) of the oil of which had separated from the aqueous layer when aqueous hydrogen peroxide, cyclohexanone, ammonia, were reacted together for 2 hours. The 16 g. of oil contained 14.2 g. of 1,1'-peroxydicyclohexylamine. The product remaining after removal of the ethanol solvent weighed 13.6 g. and contained 11-cyanoundecanoic acid (7.8 g.), caprolactam (1.8 g.) and cyclohexanone (2.5 g.).

EXAMPLE 18

1,1'-Peroxydicyclohexylamine (8 g.) in pyridine (50 g.) containing Triton B (Triton B is benzyl trimethyl ammonium hydroxide)(0.1 c.c. of a 40% aqueous solution) was heated under reflux at atmospheric pressure for 12½ hours. Distillation of the mixture, which still contained 20% unreacted peroxide gave, in addition to pyridine and cyclohexanone, a fraction (2.0 g.), b.p. 125° - 155°/15 mm., containing 40% caprolactam together with the peroxide; and a fraction (2.6 g.), b.p. 155° - 270° at 15 mm. containing the $C_{12}$ acid-amide (11-carbamoylundecanoic acid).

EXAMPLE 19

1,1'-Peroxydicyclohexylamine (8 g.) in β-picoline (10 g.) was added, during 1¼ hours, to boiling β-picoline (10 g.) (bath temperature 175° - 180°). Refluxing at atmospheric pressure was continued for a further 1¼ hours to decompose the remainder of the peroxide. Distillation gave, in addition to β-picoline and cyclohexanone, fractions (1.6 g.) consisting largely of caprolactam, and a fraction (2.2 g.), b.p. 250° - 260° at 15 mm. from which were isolated the $C_{12}$ diamide (11-carbamoylundecanoamide), m.p. 187° - 190.5°. and the $C_{12}$ acid-amide (11-carbamoylundecanoic acid), m.p. 132° - 134°.

I claim:

1. A process for the production of a derivative of an alkane-α,ω-dioic acid having nitrogen bound to the ω-carbon atom which comprises heating a compound of the formula

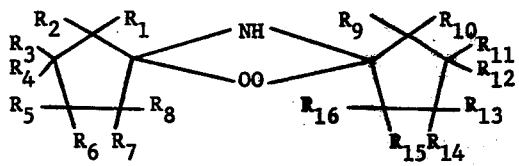

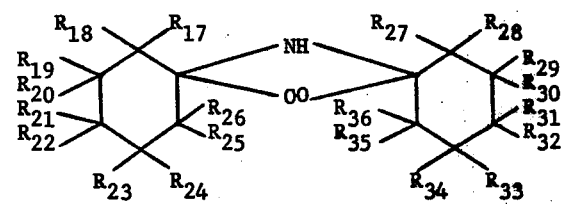

or

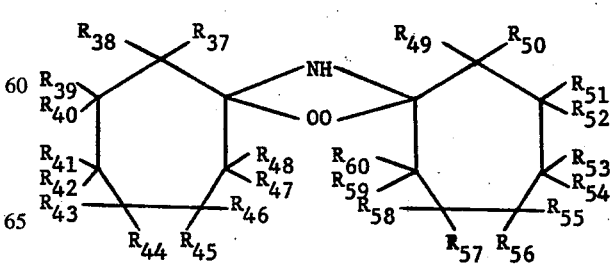

wherein $R_1$ to $R_{60}$ are lower alkyl of one to 10 carbon atoms or hydrogen, in the vapor phase at a temperature of from about 300° C. to about 1,000° C.

2. The process according to claim 1 wherein the compound has the formula

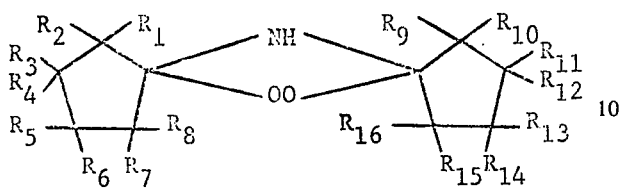

wherein $R_1$ to $R_{16}$ are alkyl of one to 10 carbon atoms or hydrogen.

3. The process according to claim 1 wherein the compound has the formula

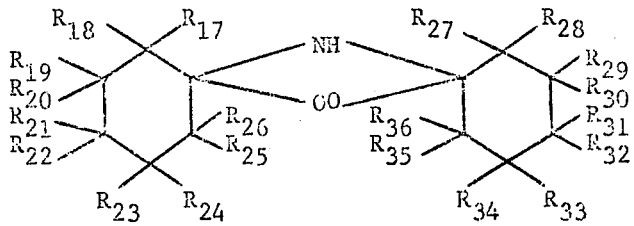

wherein $R_{17}$ to $R_{36}$ are alkyl of one to 10 carbon atoms or hydrogen.

4. The process according to claim 1 wherein the compound has the formula

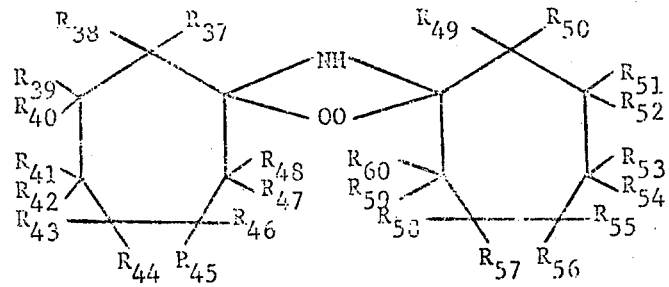

wherein $R_{37}$ to $R_{60}$ are alkyl of one to 10 carbon atoms or hydrogen.

5. The process according to claim 2 wherein the compound is 1,1'-peroxydicyclopentylamine

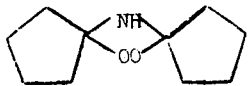

6. The process according to claim 3 wherein the compound is 1,1'-peroxydicyclohexylamine

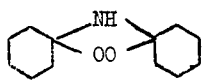

7. The process according to claim 3 wherein the compound is 4,4'-dimethyl-1,1'-peroxydicyclohexylamine.

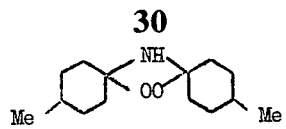

8. The process according to claim 3 wherein the compound is 3,3',5,5'-hexamethyl-1,1'-peroxydicyclohexylamine

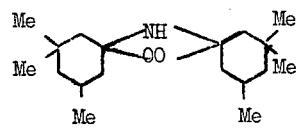

9. The process according to claim 1 wherein the temperature is in the range of from 300°C to 600°C.

10. The process according to claim 1 wherein the reaction is carried out at pressure in the range 0.1 to 300 mm.Hg.

11. The process according to claim 1 wherein the compound is fed to the reaction as a solution.

12. The process according to claim 11 wherein the solution is a solution in methanol, ethanol, cyclohexanone, pyridine, a pyridine base, chloroform, benzene, ethylene glycol or aqueous ethanol.

13. The process according to claim 1 wherein the compound is fed to the reaction in a stream of inert gas.

14. The process according to claim 1 wherein the compound is sprayed in the liquid phase into hot inert inert gas at a temperature in the range of from 300°C to 1,000°C.

15. The process for the production of 11-cyanoundecanoic acid which comprises heating 1,1'-peroxydicyclohexylamine in the vapor phase at temperatures in the range of from 300°C to 600°C.

16. Decane-1,10-dicarbonimide.

* * * * *